United States Patent [19]

Chang

[11] 4,404,326
[45] Sep. 13, 1983

[54] PRECROSSLINKED NITRILE RUBBER POLYMER BLENDS WITH LINEAR POLYMERS

[75] Inventor: Daniel M. Chang, Avon Lake, Ohio

[73] Assignee: The B. F. Goodrich Company, Akron, Ohio

[21] Appl. No.: 204,111

[22] Filed: Nov. 5, 1980

Related U.S. Application Data

[63] Continuation of Ser. No. 93,652, Nov. 13, 1979, abandoned.

[51] Int. Cl.³ .............................................. C08L 13/00
[52] U.S. Cl. .................................. 525/223; 525/226; 526/320; 526/338; 526/323.2
[58] Field of Search .............................. 525/223, 226

[56] References Cited

U.S. PATENT DOCUMENTS

| | | | |
|---|---|---|---|
| 3,070,557 | 12/1962 | Gessler | 525/237 |
| 3,150,209 | 9/1964 | Short | 525/237 |
| 3,644,590 | 2/1972 | Coulthard | 525/237 |
| 3,655,827 | 4/1972 | Finlay | 525/215 |
| 3,714,296 | 1/1973 | Kitagawa | 525/215 |

Primary Examiner—C. A. Henderson
Attorney, Agent, or Firm—George A. Kap

[57] ABSTRACT

Precrosslinked nitrile rubber polymers are prepared by interpolymerizing a polyol polyacrylate with butadiene and acrylonitrile to improve compression set, extrusion rate and die swell properties of the precrosslinked polymers and blends thereof with linear nitrile rubber polymers without sacrificing other physical and processing properties.

6 Claims, 4 Drawing Figures

PRECROSSLINKED NITRILE RUBBER POLYMER BLENDS WITH LINEAR POLYMERS

REFERENCE TO RELATED APPLICATION

This application is a continuation of parent application Ser. No. 93,652, filed Nov. 13, 1979 and entitled "Precrosslinked Nitrile Rubber Polymers And Blends Thereof With Linear Polymers", now abandoned.

BACKGROUND OF THE INVENTION

Nitrile rubber has been in commercial use for over 40 years. It is generally prepared by copolymerizing acrylonitrile with butadiene in presence of an emulsifier, a free radical catalyst and activator, as well as a chain-transfer agent. Polymerization can be carried out at temperatures below 0° C. to above 80° C. in absence of oxygen. Blends of linear nitrile rubber polymers with precrosslinked nitrile rubber polymers are also known. The precrosslinked polymers are prepared in presence of a crosslinking monomer, such as divinyl benzene, which imparts improvements to certain physical properties but sacrifices others.

Precrosslinked nitrile rubber polymers, obtained by addition of divinyl benzene to a polymerization recipe, are disclosed in the prior art. In this connection, please note the text on pp. 85 and 135 in *Rubber Chemistry Technology*, Vol. 36, No. 5, for December, 1963, and Vol. 37, No. 2, for April-June, 1964, published by Division of Rubber Chemistry of the ACS. The text discloses that crosslinked nitrile rubbers with high gel content were blended with other nitrile rubbers to improve extrusion, calendaring and dimensional stability during curing. However, the text also points out that due to a basic change in the molecular structure, properties of polymers were affected by crosslinking. These polymers not only lost much of their plasticity but also had different properties after curing. Tensile strength and ultimate elongation were much reduced; snappiness and hardness increased; rebound resilience, resistance to tear and low temperature behaviour deteriorated while compression set and swelling properties were improved. Although the novel materials of this invention show improvements in essentially the same properties as the prior art materials, they are not accompanied by the expected sacrifice of other physical and processing properties.

Another piece of prior art which is pertinent to the subject matter herein is the 1968 article by S. L. Rosen entitled "Some Rheological Properties of a Linear-Gel Polymer System" which appeared in *Applied Polymer Symposia*, No. 7, pp. 127–141. This article acknowledges the known practice of blending crosslinked polymers with linear polymers to improve melt processing of the blends and reports experiments with blends of crosslinked and linear polyethylacrylate latices prepared by emulsion polymerization with 3,10 and 30% triethylene glycol dimethacrylate as the crosslinking monomer. It should be apparent to one skilled in the art that the polyethylacrylate system is vastly different from the nitrile rubber system in that the polyethylacrylate system, as disclosed in the article, cannot be vulcanized and, therefore, is totally useless for any of the conventional rubber applications.

SUMMARY OF THE INVENTION

This invention relates to novel vulcanizable mildly precrosslinked nitrile rubber polymers, to vulcanizable blends thereof with linear nitrile rubber polymers, and to a process for preparing such mildly precrosslinked polymers and blends thereof with linear polymers. These novel polymers and polymer blends have certain superior physical and processing properties but do not suffer from severe loss of other physical and processing properties as is the case with known precrosslinked polymers of this type. Due to the improvement in the physical processing properties, the novel polymers and polymer blends are especially suitable for applications such as O-rings, hose, seals and other sundry rubber applications where properties such as lower compression set, higher extrusion rate, quicker cure rate, and lower die swell are of importance. Another improvement of such novel polymers and polymer blends resides in the fact that they can be converted to powdered rubber by simple coagulation.

More specifically, this invention relates to precrosslinked polymers and blends thereof with linear polymers wherein the precrosslinked polymer is prepared by polymerizing butadiene-type monomer and acrylonitrile-type monomer containing interpolymerized polyol polyacrylate which contains from 2 to 6 hydroxyl groups at least two of which are esterified. The polyol polyacrylate is present in sufficient amount to mildly precrosslink the polymer to the extent of improving compression set, extrusion rate and die swell, when compared to the polymer without any interpolymerized polyol polyacrylate, without sacrificing the other physical and processing properties.

REFERENCE TO THE DRAWING

During discussion of the herein-disclosed invention, reference will be made to the attached drawing which shows several plots of the more pertinent properties of the novel materials. FIGS. 1 to 4 on the attached drawing represent plots of various tests carried out on the precrosslinked nitrile rubber polymer containing about 1 part ethylene glycol dimethacrylate (EDMA) and blends thereof with linear nitrile rubber polymer prepared in the same way except without any EDMA.

DETAILED DESCRIPTION OF THE INVENTION

Figure 1:
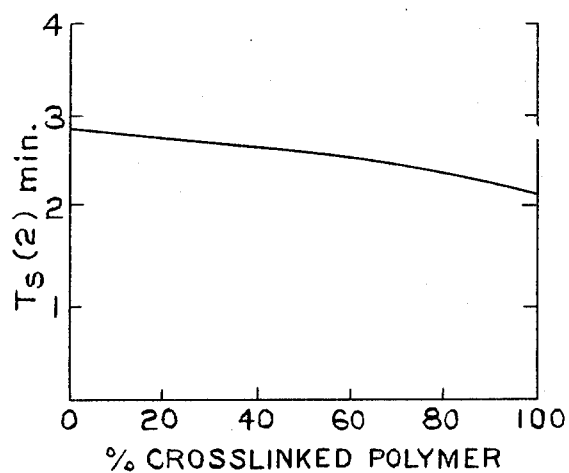
FIG. 1 represents scorch tests carried out pursuant to ASTM test D-2084-75.

The linear nitrile rubber polymer is prepared by copolymerizing a mixture containing an acrylic nitrile or a mixture of nitriles of the formula

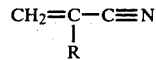

where R is hydrogen, a halogen such as chlorine, an alkyl radical of 1 to 8 carbon atoms, preferably 1 to 2 carbon atoms, or an aryl radical; with more than about 40% by weight, preferably in excess of about 60%, of a conjugated diene or a mixture of dienes of the formula

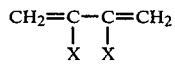

where X is hydrogen, a halogen such as chlorine, or an alkyl radical of 1 to 5 carbon atoms, and an aryl radical. Particularly suitable nitrile rubber is one prepared by copolymerizing butadiene, chloroprene, isoprene, or a mixture thereof, with acrylonitrile, chloroacrylonitrile, methacrylonitrile, ethacrylonitrile, or a mixture thereof.

Up to about 20% by weight of the diene and/or the nitrile can be replaced by known non-crosslinking ethylenically unsaturated monomers copolymerizable with the diene, such as the various vinyl monomers. Examples of such vinyl compounds include acrylic and methacrylic acids and/or their derivatives such as acrylamide, methacrylamide, and methyl, ethyl, propyl, butyl, 2-ethylhexyl and decyl esters of acrylic and methacrylic acids, vinyl halides such as vinyl chloride and vinylidene chloride; vinyl esters such as vinyl acetate and vinyl propionate; vinyl aromatic compounds such as styrene and alpha-methyl styrene; and vinyl toluenes and vinyl ethers such as vinyl isobutyl ether.

The reaction between an acrylic nitrile and a diene is carried out in a conventional manner. Using butadiene and acrylonitrile as specific examples, linear nitrile rubber latex is prepared as follows: the monomers are emulsified in water with the aid of emulsifying agents containing hydrocarbon groups of about 8 to 22 carbon atoms coupled to highly polar solubilizing groups such as alkali metal and ammonium carboxylate groups, sulfate half-ester groups, sulfonate groups, phosphate partial ester groups, and the like. The polymerization medium contains a suitable free radical generating catalyst and an activating system, as well as a chain-transfer agent. Polymerization is carried out at below 0° to 80° C. in absence of oxygen. Acrylonitrile is added incrementally during the polymerization reaction in order to obtain a nitrile rubber with good oil resistance property. Polymerization is carried out to less than 100% conversion, such as to about 80% conversion, at which time, an inhibitor is added to terminate the reaction. The product at this point is latex which is subsequently coagulated to form a copolymer in crumb form which, in turn, is compounded to produce a rubber compound which becomes a vulcanizate after curing or vulcanization.

The linear nitrile rubber polymers and the polyol polyacrylates, as well as preparation thereof, are well known in the art. Reference to any text on organic polymers will confirm this statement.

The novel, mildly precrosslinked nitrile rubber polymers of this invention are prepared in the same way as the linear polymer with the exception that an alkylene polyol polyacrylate, preferably a polyol diacrylate, is added incrementally to introduce mild crosslinking into the polymer. All of the polyol polyacrylate is added in about 2 to 6 increments, preferably in about 3 increments. Amounts of the second and subsequent increments are on about the same order of magnitude, preferably, however, in declining amounts.

The polyol polyacrylate is generally defined as being derived from a polyol containing two to six hydroxyl groups wherein at least two of the hydroxyl groups are esterified to form an acrylate ester. Examples of suitable polyols include ethylene glycol, glycerol, erythritol, arabitol and sorbitol. Preferred polyol polyacrylates include alkylene and polyalkylene glycol diacrylates having the formula

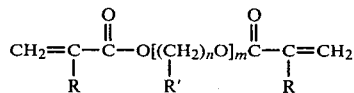

where R is selected from hydrogen, halogens, alkyl radicals containing 1 to 8 carbon atoms, and an aryl radical, preferably R is hydrogen, chlorine, or an alkyl radical of 1 to 2 carbon atoms; R' is hydrogen or an alkyl group containing from 1 to 5 carbon atoms unsubstituted or substituted with halogens, but preferably R' is hydrogen, alkyl or chloroalkyl radical containing 1 to 2 carbon atoms; n is an integer from 1 to about 8, preferably 2 to 4; and m is an integer from 1 to about 15, preferably from 2 to about 5. More preferred is the class of alkyleneglycol diacrylates which include $C_2$ to $C_4$ alkylene and polyalkyleneglycol diacrylates such as ethyleneglycol dimethacrylate, propyleneglycol diacrylate, diethyleneglycol diethacrylate, triethyleneglycol dimethacrylate, dipropyleneglycol dimethacrylate, and triethyleneglycol diacrylate. Generally speaking, the preferred polyol polyacrylates are the alkylene diol diacrylates wherein the alkylene group contains from 2 to 4 carbon atoms and wherein diacrylates include diacrylates and dimethacrylates.

In the preparation of the precrosslinked nitrile polymers, amount of diene can be in excess of about 40% by weight, preferably from about 50 to 90%, whereas amount of nitrile can vary from about 5 to 60% by weight, preferably from about 15 to 50%, based on the weight of the diene and the nitrile. Amount of polyol polyacrylate can vary from about 0.1 to 10% by weight, preferably from about 0.2 to 5%, and more preferably from about 0.5 to 2%, based on the combined weight of the diene and the nitrile.

Although the novel mildly precrosslinked nitrile rubber polymers can be alone in formulating certain products, the preferred embodiment of this invention embodies blends of the precrosslinked polymers with linear nitrile rubber polymers. Amount of precrosslinked polymer in such blends can vary from as little as about 5% by weight to essentially all precrosslinked polymer. In the preferred embodiment, weight of the precrosslinked polymer can vary from 10% to 90%, and more preferably, from 30 to 70%, remainder being the linear polymer. Weight percent given for the precrosslinked polymer is based on the combined weight of the precrosslinked polymer and the linear polymer. It should be apparent to those skilled in the art that the linear polymer need not be prepared in identical manner as the precrosslinked polymer, excepting the use of a polyol polyacrylate crosslinking agent, for blending with a precrosslinked polymer. Any linear polymer falling within the scope of this invention can be blended with any precrosslinked polymer likewise falling within the scope of this invention.

In addition to the improvements noted above, there is another important advantage of the precrosslinked polymers described herein and blends thereof with linear nitrile rubber polymers. These polymers and polymer blends can be converted to powdered rubber by simple coagulation. The coagulation procedure is a conventional one that is presently used to coagulate the nitrile rubber linear polymer latices to prepare crumb rubber. The resulting crumb rubber can be dried in either a vacuum dryer or air dryer in the usual manner. The crumbs are free flowing and nonsticky with an average particle size of about 1 to 2 millimeters. This contrasts sharply with linear nitrile rubber crumbs which are sticky and form into a coherent mass when pressed together by hand. This property of the precrosslinked polymers and blends thereof with linear polymers eliminates the need to prepare powdered rubber by grinding and thus results in substantial savings in time and money. Electron micrographs taken of the coagulated novel polymers and polymer blends show that the coagulated crumbs are agglomerates of many small particles which yield higher surface area per unit of weight of rubber compared to ground powdered rubber.

The invention described herein is further illustrated by examples which set forth preparation of precrosslinked nitrile rubber polymers and blends thereof with linear polymers, together with properties of the polymers and polymer blends.

EXAMPLE 1

This example demonstrates preparation of a precrosslinked nitrile rubber polymer with ethylene glycol dimethacrylate (EDMA) and the compounded rubber. Preparation of any linear polymer within the ambit of this invention can be carried out in the same manner as preparation of the precrosslinked polymer with the exception of omitting EDMA.

A soap solution was initially prepared in a reactor by mixing 2 parts of a fatty acid emulsifier with 0.4 part of potassium hydroxide in 195 parts of soft water. Potassium hydroxide served to neutralize the fatty acids. With continuous agitation, the following ingredients were added to the soap solution in the reactor: 0.10 part of sodium methylene-bis-naphthalene sulfonate dispersant; 0.03 part potassium carbonate buffer; 0.10 part of monosodium salt of ethylene diamine tetraacetic acid as a chelating agent for iron; and 0.008 part of NaFe salt of ethylene diamine tetraacetic acid to control release of iron. Initial portion of 23 parts of acrylonitrile and initial portion of 0.648 part of EDMA were added to the mixture in a reactor and vacuum was imposed to remove oxygen. Temperature of the contents of the reactor was maintained at about 5° C. while 76 parts of butadiene was charged. At this point, 0.08 part of sodium formaldehyde sulfoxylate reducing agent was charged to the reactor along with 0.10 part of cumene hydroperoxide initiator to initiate polymerization and 0.7 part of tertiary dodecyl mercaptan to regulate molecular weight. While the polymerization reaction was proceeding, 7.4 parts of acrylonitrile and 0.205 part of EDMA were charged to the reactor at 35% conversion. Incremental addition of the same ingredients was again repeated at 60% conversion by adding 5.3 parts acrylonitrile and 0.147 part of EDMA. When 85% conversion level was reached, a sufficient amount of hydroxyamine sulfonate was charged to terminate the polymerization reaction. At this point, the product was a latex. Coagulation of the resulting latex resulted in acrylonitrile-butadiene (AB) copolymer.

The AB copolymer was compounded in a conventional way by admixing with 100 parts by weight thereof, 5 parts of zinc oxide and 1 part of stearic acid as activation agents for vulcanization, 2 parts of an antioxidant, 50 parts of carbon black as reinforcing agent, 0.5 part of spider or elemental sulfur as curing agent, 1 part of tetramethylthiuram disulfide as curing agent for rubber and 1 part of N-oxydiethylene-2-benzothiazole sulfenamide as a curing aid and accelerator for the vulcanization reaction. The product at this point was a rubber compound which can be extruded into articles, such as hose, and then vulcanized at the usual conditions. After vulcanization, a rubber vulcanizate is produced.

EXAMPLE 2

The experiments herein were carried out in the manner described in Example 1 principally to show effect of varying amounts of polyol polyacrylate from 0.5 part to 5.0 parts per about 110 parts of the diene and the nitrile. These amounts respectively correspond to about 0.45% by weight and about 4.5%. Amounts of other ingredients, otherwise as noted, were the same as set forth in Example 1.

EXAMPLE 2

| Properties | Sample No. | | | | | | |
|---|---|---|---|---|---|---|---|
| | 1 | 2 | 3 | 4 | 5 | 6 | 7 |
| Sulfole 120 (phm) | 0.7 | .50 | 0.7 | .50 | 1.0 | 0.7 | 0.7 |
| ML-4 at 100° C. | 98 | 111 | 78 | 72 | 58 | 80 | 88 |
| Bound VCM % | 29.9 | 30.4 | 31.4 | 29.8 | 29.8 | 27.1 | 30.9 |
| Bound EDMA % | 0.45 | 0.45 | 0.9 | 0.9 | 1.8 | 1.8 | 4.5 |
| Tg | −35 | −33 | −33 | −33 | −32 | −35 | — |
| % Gel (MEK) | 73 | 57 | 86 | 88 | 89 | 83 | 95 |
| Swelling Index | 35 | 48 | 19 | 18 | 17 | 20 | 15 |
| DSV | 0.40 | 0.51 | 0.29 | 0.25 | .18 | .20 | .21 |

The above results demonstrate that increasing amount of EDMA reduces the swell index thus resulting in a tighter gel. Also, increasing amount of EDMA gives higher percent of gel.

Sample 7, containing 4.5% EDMA, is marginally acceptable because the gel is too tight, as evidenced by the low swell index. Suitability of sample 7 is further discussed in connection with the polymer blends set forth in Example 4 herein.

EXAMPLE 3

Precrosslinked nitrile rubber polymer prepared with 1 part EDMA, 75 parts butadiene and 36 parts acrylonitrile, and blends thereof with linear nitrile rubber polymers, prepared in the same way except in absence of EDMA, were subjected to various tests in order to determine suitability for applications described herein. The polymer blends were prepared by merely mixing linear latex with precrosslinked latex for about 5 to 10 minutes in a tank. The crumb rubber was prepared by coagulating the latex blend in a conventional manner.

As is apparent from FIG. 1, scorch property for 100% linear polymer vulcanizate was about 2.9 minutes and for 100% precrosslinked polymer vulcanizate, it was about 2.2. A 50-50 blend had a scorch time of about 2.7 minutes, which is very close to the scorch time for the 100% linear polymer. A scorch time greater than about 2 minutes is acceptable for seal and hose applications.

Figure 2:
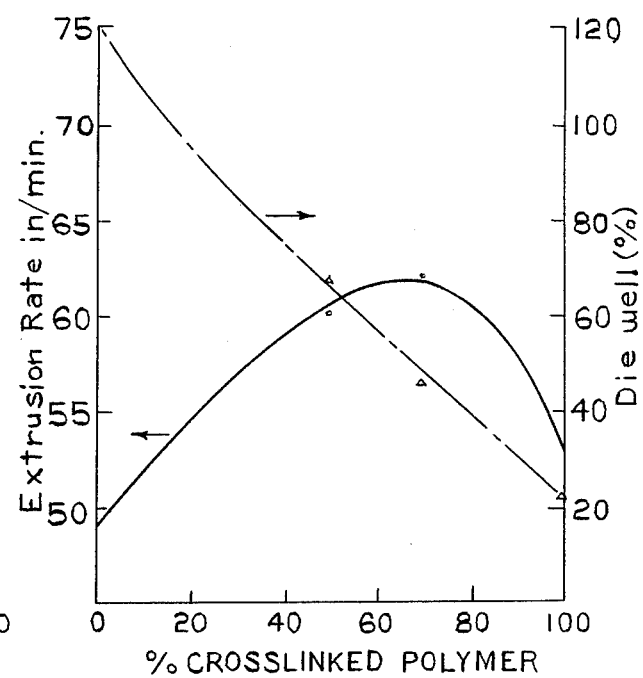
FIG. 2 is a plot of extrusion rate measured at 26 RPM and die swell versus percent crosslinked polymer. The extrusion test used was ASTM test D-2230 and die swell test was the same ASTM test D-2230, the percent die swell was determined by dividing actual cross-sectional area of the extrudate by the die opening.

Extrusion rate shown in FIG. 2 varied from about 48 inches per minute for 100% linear polymer to about 53 for 100% precrosslinked polymer. The 100% precrosslinked polymer showed improved extrusion rate which peaked at about 62 inches per minute rate for a 70/30 blend of precrosslinked to linear polymers. The difference between an extrusion rate of 48 and 62 is dramatic and is of great importance for large volume commercial applications, such as in production of hose.

FIG. 2 also illustrates the tremendous improvement in the die swell properties. Whereas die swell of 100% linear polymer was about 120%, it was only 22% for 100% precrosslinked polymer. Reduction in die swell appears to be almost linear.

Figure 3:
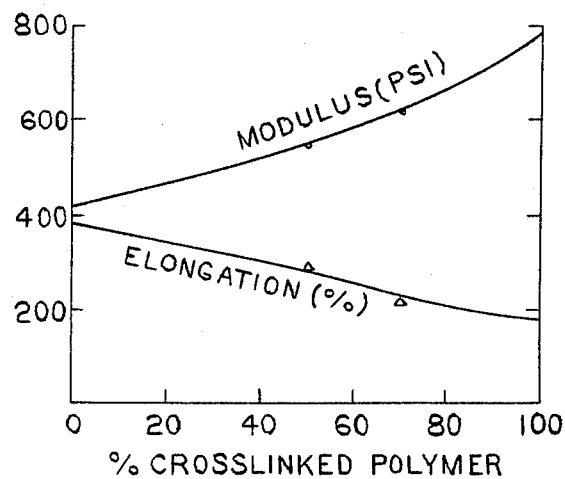
FIG. 3 shows effect of blending precrosslinked and linear polymers on modulus of elasticity and elongation. Modulus of elasticity and percent elongation were determined in accordance with ASTM test D-412-74.

FIG. 3 shows that blends of vulcanized precrosslinked and linear nitrile rubber polymers exhibit an increase in modulus of elasticity and a decrease in elongation, however, the loss in these properties is not as drastic as one skilled in the art would predict. For instance, whereas 100% linear polymer shows a modulus of about 400 psi, modulus of 100% precrosslinked polymer is about 800 psi, or about double that of linear polymer. To minimize effect of the increased modulus, a 70/30 blend of precrosslinked polymer to linear polymer can be used which has a modulus of about 600 psi. In terms of percent elongation, the 100% linear polymer shows a value of about 400% and 100% precrosslinked polymer, about 180%. In this instance, a 70/30 blend would yield elongation of about 220%. Acceptable elongation for seal and hose applications should be greater than about 200%.

Figure 4:
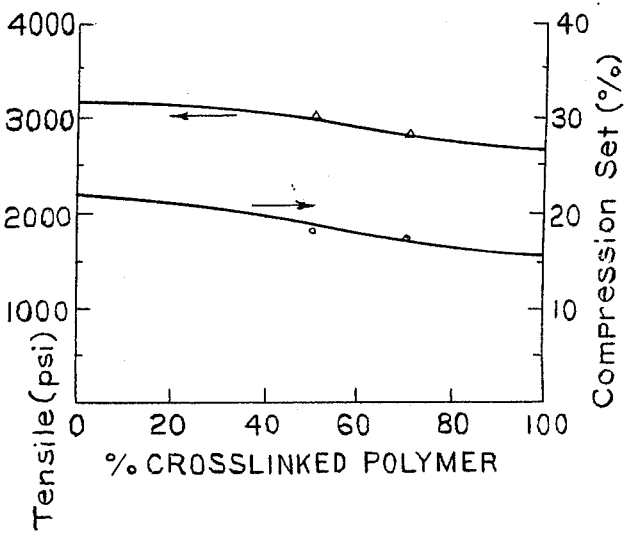
FIG. 4 is a plot of tensile strength, determined in accordance with ASTM test D-412-74, and compression set, determined pursuant to ASTM test D-395-69.

FIG. 4 illustrates that tensile strength of the precrosslinked polymer vulcanizate is lower, and thus worse, then the linear polymer although the adverse affect of this property is substantially reduced by the use of polymer blends. A 70/30 blend yields a tensile strength of about 3000 psi compared to about 3200 psi for the linear polymer alone. Tensile strength in excess of about 2800 psi is acceptable for rubber applications.

Compression set of the precrosslinked polymer is much less, and thus much improved, than for the linear polymer. A 70/30 polymer blend yields a compression set of about 16%, which is essentially the compression set for the precrosslinked polymer alone. Compression set for 100% linear polymer is about 22%. Note FIG. 4.

Evaluation of test data shows that precrosslinked polymers and blends thereof with linear polymers exhibit improvements in such critical properties as compression set, faster extrusion rate, and lower die swell than the linear polymer. Although not demonstrated herein with supporting data, the precrosslinked polymer and blends thereof with linear polymers also show faster, and thus improved, cure rates. One of the unexpected features of this invention resides in the fact that the above-noted improvements are achieved without the expected sacrifice of the other physical and processing properties, such as modulus of elasticity, elongation, and tensile strength. Reduction in these properties is well within the acceptable limits for rubber applications, especially seal and hose applications.

EXAMPLE 4

Three blends of precrosslinked and linear polymers were prepared to demonstrate that 4.5 parts per 100 parts of butadiene and acrylonitrile copolymers yields products with acceptable properties. The blends are stated in weight of precrosslinked polymer to weight of linear polymer.

| Properties | Blends | | |
|---|---|---|---|
| | 30/70 | 50/50 | 70/30 |
| die swell rating | 4 | 4 | 4 |
| compression set, % | 18 | 18 | 16 |
| extrusion rate, in/min. | 75 | 84 | 63 |
| modulus of elasticity, psi | 800 | 980 | 1200 |
| tensile strength, psi | 2700 | 2260 | 1800 |
| elongation, % | 250 | 160 | 130 |

Since tensile strength of nitrile rubber vulcanizate should be in excess of about 2800 psi and elongation in excess of about 200% to be suitable for seal and hose applications, it should be apparent that the above 50/50 and 70/30 blends would not be acceptable. The 50/50 blend shows a tensile strength of only 2260 psi and elongation of only 160% whereas the 70/30 blend has an even worse tensile strength of 1800 psi and an even worse elongation of 130%. It is important to note that the 30/70 blend, however, exhibits some very good properties, the only negative feature appears to be the tensile strength of 2700 psi, which is slightly less than what is considered to be acceptable.

Results of this experiment compel the conclusion that 4.5 parts of a polyol polyester per 100 parts of the diene and the nitrile monomers in the preparation of the precrosslinked nitrile rubber polymers will yield acceptable products when the precrosslinked polymers are blended with suitable amounts of the linear polymers. Another conclusion that can be drawn from the data in this and other examples herein is that as amount of a polyol polyacrylate is increased in the precrosslinked polymer, it may be necessary to reduce the amount of precrosslinked polymer in the blend. This is especially true of the results given in this example on blends prepared with 4.5 parts EDMA per 100 parts of diene and nitrile monomers. Experience with the above blends shows that at higher amounts of polyol polyacrylate, it becomes more difficult to feed compounded nitrile rubber into the extruder because the precrosslinked polymer is too tight due to excessive crosslinking.

Other modifications of the compositions of this invention are possible and it is to be understood that the specific examples described herein are for the purpose of illustration only.

I claim:

1. A polymer blend of a precrosslinked polymer and a linear polymer in a relative amount of from 5 to 95% precrosslinked polymer which blend can be coagulated to a free-flowing non-sticky powder, the precrosslinked polymer contains copolymerized therein a polyol polyacrylate derived from a polyol having 2 to 6 hydroxyl groups at least two of which are esterified to form an acrylate ester and is present in an amount sufficient to mildly precrosslink the precrosslinked polymer to the extent of improving compression set, faster extrusion rate, and lower die swell set without the expected sacrifice of modulus of elasticity, elongation, and tensile strength, the precrosslinked polymer consists essentially of at least 50% diene units with remainder being nitrile units, the diene units being derived from a diene monomer having the formula

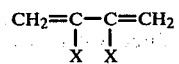

where X is hydrogen, an alkyl radical of 1 to 5 carbon atoms, or an aryl radical, and the nitrile units being derived from a nitrile monomer having the formula

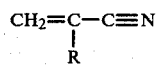

where R is hydrogen, a halogen, an alkyl radical of 1 to 8 carbon atoms, or an aryl radical; the linear polymer being defined same as the precrosslinked polymer but without the polyol polyacrylate.

2. Polymer blend of claim 1 wherein amount of the precrosslinked polymer in the blend is 10 to 90% by weight and the precrosslinked polymer consists essentially of at least 60% of the diene units.

3. Polymer blend of claim 2 wherein the polyol polyacrylate has the formula

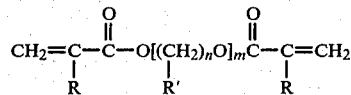

where R is hydrogen, halogen, an alkyl radical of 1 to 8 carbon atoms, or an aryl radical; R' is hydrogen, or an alkyl radical of 1 to 5 carbon atoms unsubstituted or substituted with halogen(s); n is an integer of 1 to about 8; and m is an integer of 1 to about 15; amount of the polyol polyacrylate is about 0.2 to 5% by weight.

4. Polymer blend of claim 3 wherein R in the formula for the nitrile is hydrogen, chlorine, or an alkyl radical of 1 to 2 carbon atoms; R in the formula for the polyol polyacrylate is hydrogen or an alkyl radical of 1 to 2 carbon atoms, R' is hydrogen, alkyl or chloroalkyl radical containing 1 to 2 carbon atoms, n is 2 to 4, m is 2 to about 5, and amount of the polyol polyacrylate is about 0.5 to 2% by weight.

5. Polymer blend to claim 4 wherein the diene monomer is selected from butadiene, isoprene, and mixtures thereof; the nitrile monomer is selected from acrylonitrile, chloroacrylonitrile, methacrylonitrile, ethacrylonitrile, and mixtures thereof; and the polyol polyacrylate is selected from ethyleneglycol diacrylate and dimethacrylate, triethyleneglycol diacrylate and dimethacrylate, propyleneglycol diacrylate and dimethacrylate, diethyleneglycol diacrylate and dimethacrylate, dipropyleneglycol diacrylate and dimethacrylate, and mixtures thereof.

6. Polymer blend of claim 5 wherein amount of the precrosslinked polymer in the blend is 30 to 70% by weight, remainder being the linear polymer.

* * * * *